Feb. 5, 1957 B. LONG 2,780,032
IMPROVEMENTS IN APPARATUS FOR THE CONTINUOUS
DRAWING OF GLASS SHEETS
Filed Feb. 5, 1953 3 Sheets-Sheet 1

BERNARD LONG
By
Emery Holcombe & Blair

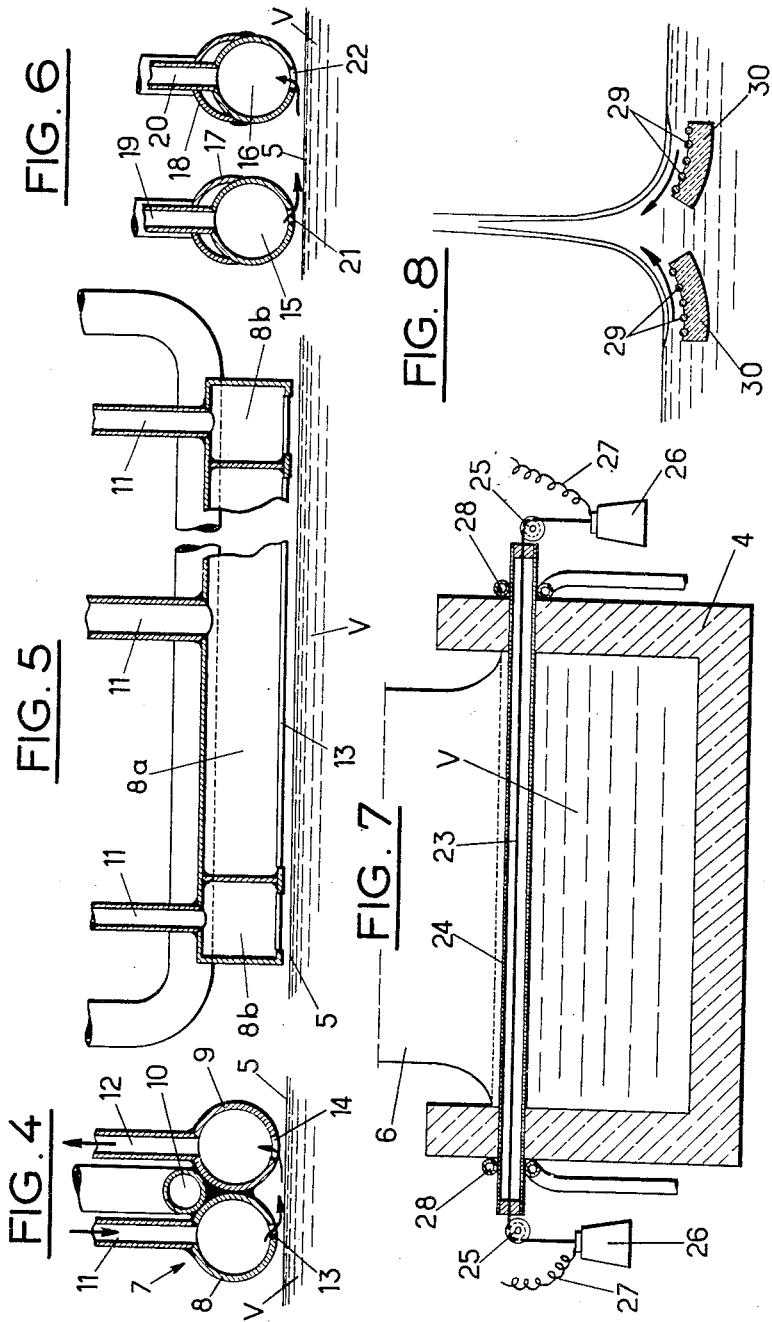

Feb. 5, 1957 B. LONG 2,780,032
IMPROVEMENTS IN APPARATUS FOR THE CONTINUOUS
DRAWING OF GLASS SHEETS
Filed Feb. 5, 1953 3 Sheets-Sheet 3

BERNARD LONG
By
Emery, Holcombe & Blair

United States Patent Office 2,780,032
Patented Feb. 5, 1957

2,780,032

IMPROVEMENTS IN APPARATUS FOR THE CONTINUOUS DRAWING OF GLASS SHEETS

Bernard Long, Paris, France, assignor to Compagnies Reunies des Glaces & Verres Speciaux du Nord de la France, Paris, France, a corporation of France Application February 5, 1953, Serial No. 335,286

Claims priority, application France February 16, 1952

2 Claims. (Cl. 49—17)

The present invention relates to apparatus for the continuous drawing of glass into sheet form by means of which the drawing speed is increased.

It is well known of course that it is only possible to effect the continuous mechanical drawing of a sheet of glass if the temperature of the glass is higher than its upper devitrification limit. However, when this condition is fulfilled, the viscosity of the glass is comparatively slight so that, for it to be given the form of a flat sheet having a satisfactory quality of surface, it has to be rapidly cooled at the very moment it is being drawn in order that the sheet may have the requisite overall rigidity and hardness of surface before making contact with the first mechanical members serving to transmit the drawing stresses. These latter members are represented by a first pair of draw rollers in the Fourcault and Pittsburgh methods and by a bender roller in the Libbey-Owens method.

In present practice, this cooling is effected by means of metal casing provided with water circulation acting on the glass which is forming the surface of the foot part of the sheet as well as on the glass sheet itself at the start of its vertical ascent.

In each drawing process, this method of cooling enables, for a given thickness of the glass, a maximum speed to be obtained which is well known to those in the art.

It should be pointed out however that the cooling action produced by these members irrespective of their numbers or manner of arrangement not only affects the surface of the glass but also the underlying glass up to a depth of several centimetres and even more. The cause of this is that the glass parts with its heat for the most part through radiation, the transparency of the glass causing this to take place up to some depth. In other words, this method of cooling not only increases the viscosity of the glass on the surface of the sheet but also that of the underlying glass forming the interior of the sheet.

It is among the objects of the present invention to provide improvements in means for the continuous mechanical drawing of glass in sheet form, this means enabling the maximum drawing speed to be greatly increased for a given thickness and consists essentially of apparatus for creating at the surface of the foot of the sheet a surface layer or skin of high viscosity whereas the glass inside the foot of the sheet possesses a relatively low viscosity. In accordance with the present invention, two skins are formed at the foot of the glass having a high viscosity and between these two skins is the glass having a relatively low viscosity.

The invention from one of its aspects is based on the fact that a sudden and considerable decrease in the viscosity is found on passing from the thin surface film termed the "skin" to the internal portion of the foot of the sheet.

The formation of a skin of high viscosity at the surface of the foot of the sheet enables a sort of sheath to be formed by the two adjacent skins, said sheath being almost rigid and being able to withstand the mechanical drawing forces and being filled with glass which is much less viscous. In order to effect this filling the sheath has to be carried along at higher speed than that used for drawing in the known processes. Indeed, the friction force for a difference of speed of unity which is exerted between the filling glass and the walls of the sheath being less, the speed of said sheath has to be greater so as to counterbalance the effect of the downwardly directed forces, gravity in particular, which are acting on the filling glass being carried along. Consequently, the increase in the drawing speed which is a valuable advantage obtained according to the invention, becomes in fact a necessity.

It must be observed that increasing the speed of the drawing results in a heavier extraction from the furnace. Under these conditions, if neither the dimensions nor the heating conditions of the furnace are changed, the glass which passes into the drawing chamber will be at a higher temperature, thus enabling an even less viscous core to be obtained for a given skin. It will be realised therefore that the apparatus according to the present invention is so to speak "self-accelerating;" consequently, it would be an advantage, in order to increase the drawing speed, to shorten the part of the furnace connecting the refining zone with the drawing chamber so as to get hotter glass in the latter chamber.

According to one embodiment of the present invention, the general arrangement of the furnace could be left unchanged, and the portion of the glass sheet which is distinct from the skin and referred to hereinbefore as the "core" could be fed with glass having a low viscosity obtained by increasing the temperature of the central portion of the foot of the sheet by means of some suitable auxiliary means.

The glass supplying the core of the sheet is mainly that situated directly under the skin at the enlarged zone of the foot of the sheet extending up to the point where it connects with the free surface of the bath. Consequently, the temperature of the glass would have to be raised mainly in that part of the bath which is located under this zone.

However, since a certain amount of glass is carried into the core of the sheet from an area which is directly below the sheet, it may be advisable to apply heat at this point and bring about an ascending movement of the hotter glass there.

It is necessary to state at this point that when the viscosity of the glass forming the core is particularly low at the time when the skin, provided with an increased speed, is carrying it along by friction, the core has to be stiffened immediately on its formation close to the spot where the foot of the sheet closes in rapidly.

Indeed, it is necessary to take measures to prevent the level of the glass from becoming too great, this glass being relatively mobile inside the almost rigid sheath formed by the skin, otherwise there will be a risk of thinning or attenuation of the chest.

The aforesaid stiffening of the core is effected by means of two metallic boxes or casings provided with water circulation disposed on either side of the sheet. This helps to bring about the rigidity the sheet requires so as to be stable.

The present invention aims more particularly at localising the cooling of the glass as much as possible to a very small thickness. This localisation is preferably brought about by using a cooling method employing forced convection, or circulating in contact with the surface of the glass a gaseous fluid at a lower temperature, for instance, air, water vapour, an inert gas, etc.

Owing to the low thermal diffusion of glass, the cooling of its surface is only transmitted to a slight distance into the underlying layers during the time which is needed for the surface glass to reach the lower part of the sheet under formation so that an actual skin having a high viscosity is created.

It is necessary to point out that for a given drop in temperature of the surface, a skin is obtained the viscosity of which is all the greater the more rapidly the viscosity of the glass which is being worked varies with temperature. The soda-calcium glasses having this property and known as "short" glasses in the glass industry are known to be rich in lime and possess a moderate soda content; such glasses have hitherto not been suitable for continuous mechanical drawing owing to their tendency to devitrification.

However, the present invention provides a large margin of security as regards the devitrification as it enables a sheet to be drawn when the viscosity of the glass is substantially lower than that possessed by "short" glass as mentioned at their top devitrification limit. Consequently, such soda-calcium glasses which are rich in lime and have a moderate content of soda and which are of interest owing to their cheapness and great resistance to atmospheric agents can be drawn at high speed by the method of the invention. This constitutes another advantage of the invention and represents a considerable improvement in the mechanical manufacture of sheet glass by drawing.

The invention compresses devices enabling the glass forming the skin of the sheet to be cooled by forced convection, while other devices enable the temperature of the glass supplying the core of the sheet to be raised if necessary or desirable while at the same time the skin of high viscosity is being formed.

The cooling arrangements consist of two kinds of members, namely:

(a) Blower members which project a gaseous fluid on to the glass at an angle and at a suitable speed and temperature;

(b) Suction members which take up the gaseous fluid and evacuate it from the drawing chamber as soon as it has swept over the surface of the glass, these members being necessary in order to prevent the occurence of eddying of the gaseous fluid in the drawing chamber, whose effect might be harmful, particularly by causing irregular cooling of the faces of the sheet.

These two types of members may be arranged in a single apparatus or they may be arranged a short distance from each other. In general, the blower members and the suction members are arranged with their axes parallel to the sheet.

In principle, the apparatus composed of a blower member and a suction member exercises a blowing and suction action uniformly along its entire length but, as it is necessary to adapt the cooling by forced convection to the various regions over the width of the sheet, it is necessary to have several blower-suction groups over the width of the sheet. As a general rule, three groups are sufficient, one for the central zone and one for each of the two marginal zones.

Since the intensity of the cooling may be varied by regulating the speed and the temperature of the gaseous fluid on the surface of the glass, one apparatus is generally sufficient located on either side of the sheet. However, it may be preferable, particularly when the thickness is great, to form the high viscosity skin by several superimposed coolings. In such a case, the cooling devices are located in stages starting a certain distance in front of the meeting point of the foot of the sheet with the glass bath and terminating at the point at which the sheet properly speaking starts.

The arrangements which enable, where this is required, the core of the sheet to be supplied or fed with glass having an even smaller viscosity, may be of various types, but in general consist of electrical resistors or resistances immersed in the bath. Generally, there are two resistances or sets of resistances arranged on either side of the sheet a short distance underneath the two skins of the foot of the sheet and, sometimes also, one central resistance or set of resistances the axis of which is situated directly under the sheet.

The heating of the glass feeding the core of the sheet may be effected by means of two electrodes which penetrate into the glass on either side of the drawing chamber, these electrodes being connected to some suitable source of alternating voltage so as to heat the glass by internal Joule effect directly under the sheet over a zone extending horizontally over its entire width and vertically over a small height below the level of the glass in the drawing chamber. With this embodiment, the heating of the column of glass between the two electrodes by Joule effect is started by means of an auxiliary resistance.

Several various possible embodiments of the invention are illustrated in schematical manner in the accompanying drawings, wherein:

Figure 4 is a cross-sectional view of a device combining a blower member and a suction member.

Figure 5 represents a longitudinal sectional view of the same device.

Figure 6 represents a cross-sectional view of a device in which the blower member, on the left, and the suction member, on the right, are separate.

Figure 7 represents an elevation showing the sheet without the usual arrangements for holding the edges and showing inside the glass bath one of the devices for heating the glass forming the core of the sheet by means of an independent electric resistance.

Figure 8 is a vertical section showing two other heating devices which are better adapted for the carrying along of the two layers of glass of low viscosity mainly feeding the core part of the sheet.

Figure 1:
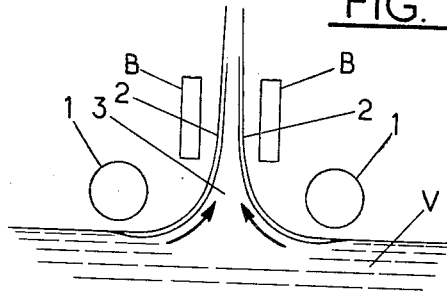
Figure 1 is a vertical section illustrating in purely schematical manner the formation of the sheet of glass by the means of the invention.

As shown in Figure 1, two skins 2 are formed according to the method of drawing of the invention by means of cooling with the aid of cooling members 1, 1 (which may be of the type shown in Figure 2 or the type illustrated in Figure 3) at the start of the foot of the sheet from the glass bath V, these skins 2 forming in a manner of speaking a sheath into which the glass 3 coming from the bath V and possessing a sufficiently low viscosity is carried along through the drawing action.

The two cooling casings B, B in which circulates a cooling fluid serve to firm the core of the sheet starting from the summit of the foot enlargement, this effect being brought about by radiation.

Figure 2:
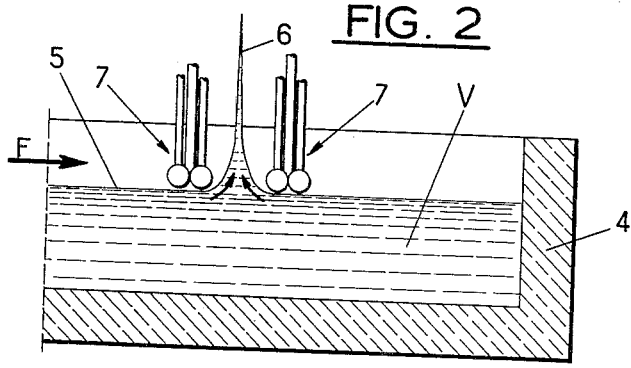
Figure 2 is a vertical longitudinal section of a drawing chamber, neither the roof nor the mechanical drawing arrangements being shown, the increase of the drawing speed being produced by the application of two coolers acting by forced convection on the surface glass.

In Figure 2 a drawing chamber is shown consisting of a refractory masonry 4 containing the glass bath V the level of which is shown by the horizontal line 5. The glass from a basin furnace, not shown in the drawings, passes into the drawing chamber in the direction of the arrow F. The sheet 6 is drawn from the free surface 5 by means of a known type of industrial process.

The cooling action, giving rise to the skin of the foot of the sheet 6 is produced in this embodiment by means of two forced convection arrangements 7. Each of these devices consists of a group of three tubes, shown in greater detail in Figures 4 and 5, connected together for example by welding. These tubes are namely, a blower tube 8, a suction tube 9 and a cooling tube 10 situated above the two former tubes. The blower tube is divided into three sections, as illustrated in Figure 5. A central section 8a extends over the greater part of the width of the sheet and two end sections 8b are situated opposite the two marginal zones of the said sheet.

The cooling fluid is supplied to the three sections of the blower tube 8 by the three pipes 11.

The suction tube 9 is also divided into three sections which correspond to the three sections of the blower tube and the cooling fluid after sweeping the surface 5 of the glass is evacuated by means of three pipes 12.

The cooling fluid emerges under pressure from the tube 8 through the slot 13 and is taken up by the slot 14 which is wider than the slot 13, formed in the tube 9. This fluid follows the course indicated by the arrows in Figure 4.

The supply pipes 11 for the three blower sections pass through the roof, not shown, of the drawing chamber and are connected to three separate outside chambers under constant pressure, not shown in the drawing. The evacuating pipes 12 are connected to external vacuum chambers, also not represented in the drawing. As all the pipes and tubes mentioned are working at high temperatures during the operation they should be made of a stainless heat-resisting steel.

The tubes 8 and 9 are heated most and to prevent them from deforming they are welded to one another and to the tube 10 which is traversed by a cooling fluid such as water or vapour.

It may be pointed out that the tubes 8 and 9 are allowed to become heated to the limits of safety imposed by the risks of deformation and oxidation as they have only to produce a negligible cooling action on the glass.

The tube 10 which is cooler is placed above the tubes 8 and 9 in a position in which there can be no exchange of heat by radiation with the glass bath.

The cooling fluid which emerges through the slot 13 and is evacuated through the slot 14 is generally air or steam or vapour. The cooling by forced convection that the cooling fluid produces on the glass and which is localised in its skin can be regulated or proportioned over wide limits by acting on its speed, that is to say, on its pressure inside the tube 8.

The device 7 which has just been described represents only one of the possible embodiments of the forced convection cooling arrangement, this embodiment grouping the blower and suction devices together. Other different arrangements might however be formed within the scope of the invention.

Figure 6 shows on the left the blower tube 15 and, on the right, the corresponding suction tube 16, the position of each of these tubes being fixed depending on the result sought.

The tube 15 is provided at its upper part with a sheet metal chamber 17 in which circulates a cooling fluid, the tube 16 being provided with a similar chamber 18. Each of the tubes 15 and 16 consists of three sections, a central section and two marginal sections. The air (or other gaseous fluid) arrives in the blower tube through supply pipes 19 while the pipes 20 serve for the evacuation of the air (or other gaseous fluid) after it has swept the surface of the glass.

The blower slot 21 is narrower than the suction slot 22.

Whatever known types of devices are applied for supplying or feeding glass symmetrically to the core of the sheet, such devices varying according to the depth of the drawing chamber, it is clear that as a result of the localization of the cooling within a slight thickness or skin of glass which acquires a high viscosity owing to the forced convection devices 7, the core of the sheet is constituted by glass at relatively high temperature and, consequently, having a low viscosity.

For a given thickness, the speed of drawing is therefore of necessity greater than is the case with the methods hitherto used where the viscosity of the glass forming the core is not very much less than that of the surface glass.

Maximum increase in the speed is obtained by regulating the thickness and viscosity of the skin in dependence on the temperature of the glass of the core, the latter being closely linked up with the cooling of manufacture, which is more or less large, undergone by the glass before it passes into the drawing chamber.

It may be observed here that by associating the heating of the glass from the interior of the foot of the sheet as mentioned hereinbefore with cooling using two casings provided with a water circulation, such as is generally used in present day drawing methods, the deep cooling action by radiation effected by means of the said casings having a water circulation may be offset to a certain extent.

It is hardly necessary to add however that the increase in speed obtained in this manner, although it is appreciable, is far from being as large as where a skin of high viscosity is formed by means of cooling with forced convection.

Figure 3:
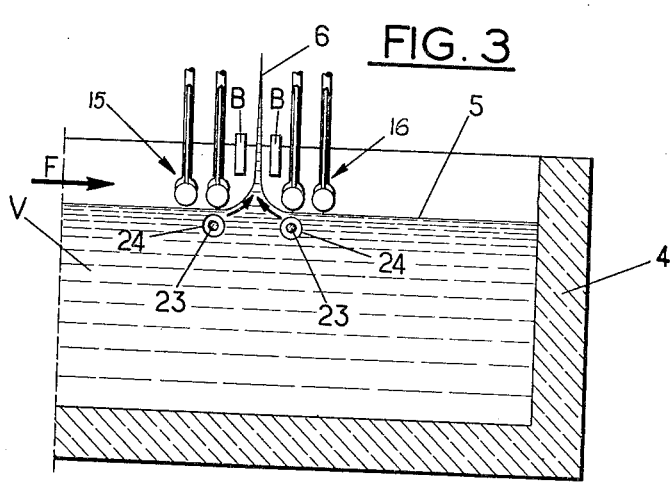
Figure 3 is a similar section view of a drawing chamber, the roof and drawing arrangements of which are also not shown, the two forced convection cooling devices being combined with two devices serving to raise the temperature of the two layers of glass feeding the core part of the sheet.

The drawing chamber represented in Figure 3 is much deeper than that shown in Figure 1 and it is furnished with two heating devices 23 which are immersed some slight distance beneath the surface 5 of the bath V, these heating devices being placed on either side of the sheet 6 close to the places at which are formed the two skins of the sheet and extending throughout its width. The function of these devices is to raise the temperature of the glass in contact with their casings 24 and this glass as it ascends comes into contact with the two skins which carry it along by friction, feeding in this manner the core part of the sheet. These devices 23 of which is provided with an electrical resistance are shown on a larger scale in Figure 7.

In this particular embodiment each of the devices which are used for creating the high viscosity skin of the sheet consists of a separate blower and suction member, these members being shown on a larger scale in Figure 6.

The heating arrangements 23 enable the rise of the temperature of the core of the sheet to be regulated as a function of the thickness and the viscosity of the skin and the maximum of drawing speed to be found, as previously mentioned. The rise of temperature in question is however small since the glass is then in a condition where its viscosity varies rapidly with the temperature. Consequently the electrical energy which is brought into play is very slight.

The cooling casings B, B serve for stiffening the glass having a low viscosity and feeding the core of the sheet as soon as said glass reaches the narrowing at the top of the foot of the sheet, at the place where the sheet begins.

In Figure 7 are shown details of a first embodiment of electric heating device to be used for heating the glass which is to form the core of the sheet. This device consists of a casing tube 24 made of some suitable material such as vitreous silica, porcelain or other ceramic material which is practically immune to the action of the glass and a resistance 23 extending through the tube subjected to tension by means of two pulleys 25 insulated from the earth and two weights 26, the resistance being connected by wires 27 to a source of electric energy of suitable voltage enabling it to be heated by Joule effect.

Two rings 28 provided with water circulation prevent glass from leaking out between the tube 24 and the holes in the refractory walls 4 through which it passes.

The tube casing 24 is necessary when the resistance 23 is made of an alloy which is liable to colour the glass, this being so for instance in the case of refractory alloys possessing high resistivity and having a base of nickel and chrome but, if platinum or certain of its alloys or certain other metals which are practically unattackable by glass at 1000° such as molybdenum, for instance, are used for the resistance, then it would be possible to dispense with the sheathing or casing 24 as is the case for the two heating arrangements shown in Figure 8, a better transmission of the heat being possible in this manner.

Each of these devices consists of a resistance 29 made of platinum wire or other suitable metal arranged in the form of a Greek key lodged in the grooves of an element 30 made of refractory material such as for example sillimanite extending over the whole width of the foot of the sheet. The glass which is to form the core of the sheet follows the direction of the arrows as shown in Figure 8.

Figure 9:
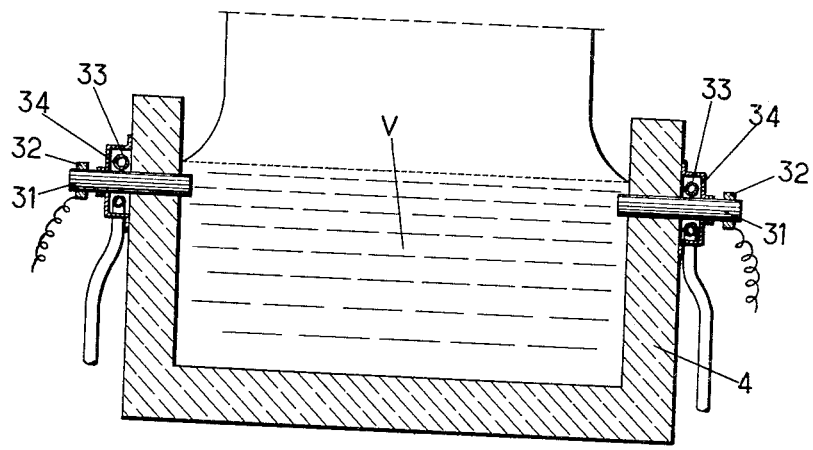
Figure 9 is a side elevation similar to the view shown in Figure 7, but showing a modified form of heating arrangement formed in this instance by two electrodes passing through the side walls of the drawing chamber and penetrating into the glass bath a slight distance beneath the surface.

According to the embodiment shown in Figure 9 the heating of the glass intended to form the core of the sheet is obtained by an internal Joule effect produced by means of two electrodes 31 made of graphite or a metal such as molybdenum penetrating a short distance into the bath. These electrodes are connected to a source of electrical energy by means of the metal collars 32. Leakage of molten glass and oxidation of the electrodes at the outside of the refractory wall 4 are avoided by means of rings 33 provided with a water circulation and boxes 34.

Having thus described the invention, what I claim as new and desire to secure by Letters Patent of the United States is:

1. Apparatus for the manufacture of sheet glass comprising means for holding a bath of molten glass, means for continuously drawing a glass sheet upwards from the surface of said bath, convection cooling means for blowing a gaseous cooling fluid against said surface immediately before the glass enters the foot of the sheet and means for cooling said sheet by radiation at the point at which it first attains its final thickness, in which said convection cooling means comprises a blower tube, a suction tube, and a cooling tube, said blower tube being provided with a slot for the outlet of the fluid, and said suction tube being provided with a wider slot for the suction of the fluid after it has acted on the glass and has to be evacuated.

2. Apparatus as claimed in claim 1, wherein the blower and suction tubes are each divided along their lengths into three sections, namely a central section extending over the greater part of the width of the sheet and two end sections opposite the two marginal zones of the sheet.

References Cited in the file of this patent
UNITED STATES PATENTS

| Number | Name | Date |
|---|---|---|
| 966,652 | Colburn | Aug. 9, 1910 |
| 1,463,582 | Hitchock | July 31, 1923 |
| 1,489,875 | Whittemore | Apr. 8, 1924 |
| 1,615,842 | Hitner | Feb. 1, 1927 |
| 1,645,053 | Howard | Oct. 11, 1927 |
| 1,879,698 | Long | Sept. 27, 1932 |
| 1,953,341 | Drake | Apr. 3, 1934 |
| 2,125,914 | Haight | Aug. 9, 1938 |
| 2,178,520 | Howard | Oct. 31, 1939 |
| 2,246,053 | Magrini | June 17, 1941 |
| 2,258,118 | Magrini | Oct. 7, 1941 |
| 2,274,986 | Kilian et al. | Mar. 3, 1942 |
| 2,598,893 | Drake | June 3, 1952 |